United States Patent [19]

Kessler

[11] 4,274,236
[45] Jun. 23, 1981

[54] HIGH STIFFNESS CELLULAR PLASTIC SIDING

[76] Inventor: Gerald Kessler, Box 389, McClurg Rd. at Southern Blvd., Youngstown, Ohio 44512

[21] Appl. No.: 937,455

[22] Filed: Aug. 28, 1978

[51] Int. Cl.³ .............................................. E04C 1/00
[52] U.S. Cl. .................................... 52/309.8; 52/518; 428/170; 428/159; 428/167
[58] Field of Search ................. 52/309.4, 309.8, 309.9, 52/318, 309.6, 309.7; 428/170, 218, 160, 159, 167

[56] References Cited

U.S. PATENT DOCUMENTS

| 2,339,489 | 1/1944 | Kublanow | 154/2 |
| 2,816,853 | 12/1957 | Meyers | 154/106 |
| 3,365,353 | 1/1968 | Witman | 428/170 |
| 3,370,117 | 2/1968 | Blue | 428/160 |
| 3,458,337 | 7/1969 | Rugg | 428/159 |
| 3,478,138 | 11/1969 | Friesner | 264/145 |
| 3,504,467 | 4/1970 | Hatch | 52/309.1 |
| 3,574,659 | 4/1971 | Kwart | 428/170 |
| 3,795,180 | 3/1974 | Larsen | 272/3 |
| 3,815,310 | 6/1974 | Kessler | 52/531 |
| 3,936,518 | 2/1976 | Soda | 264/45.5 |
| 3,998,021 | 12/1976 | Lewis | 52/531 |
| 4,022,643 | 5/1977 | Clark | 156/78 |
| 4,034,528 | 7/1977 | Sanders | 52/309.4 |
| 4,068,030 | 1/1978 | Witman | 428/170 |

FOREIGN PATENT DOCUMENTS 1444816  5/1966  France .................................. 52/309.4

Primary Examiner—Price C. Faw, Jr.
Assistant Examiner—Henry E. Raduazo
Attorney, Agent, or Firm—Browdy & Neimark

[57] ABSTRACT

A high stiffness siding for use on the exterior surfaces of buildings, particularly houses, in an overlapping pattern, is formed of unitary structural foam plastic, preferably polyvinyl chloride, with integral reinforcing ribs on its internal surface. The thickness of the siding is about 55–85 mils, with the ribs being about 25–65 mils thick; the density of the foam is about 0.85 to 1.15, except in the vicinity of the ribs, the ribs having a density of about 0.75.

7 Claims, 6 Drawing Figures

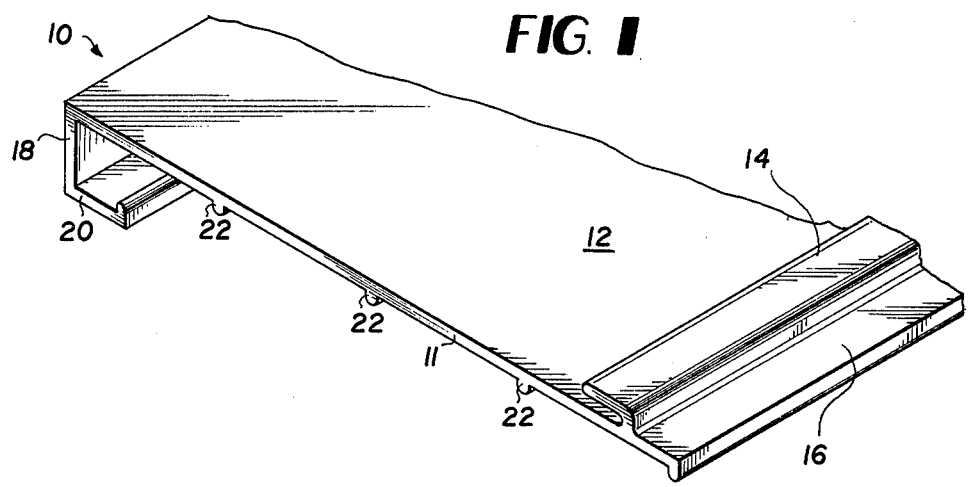
FIG. 1
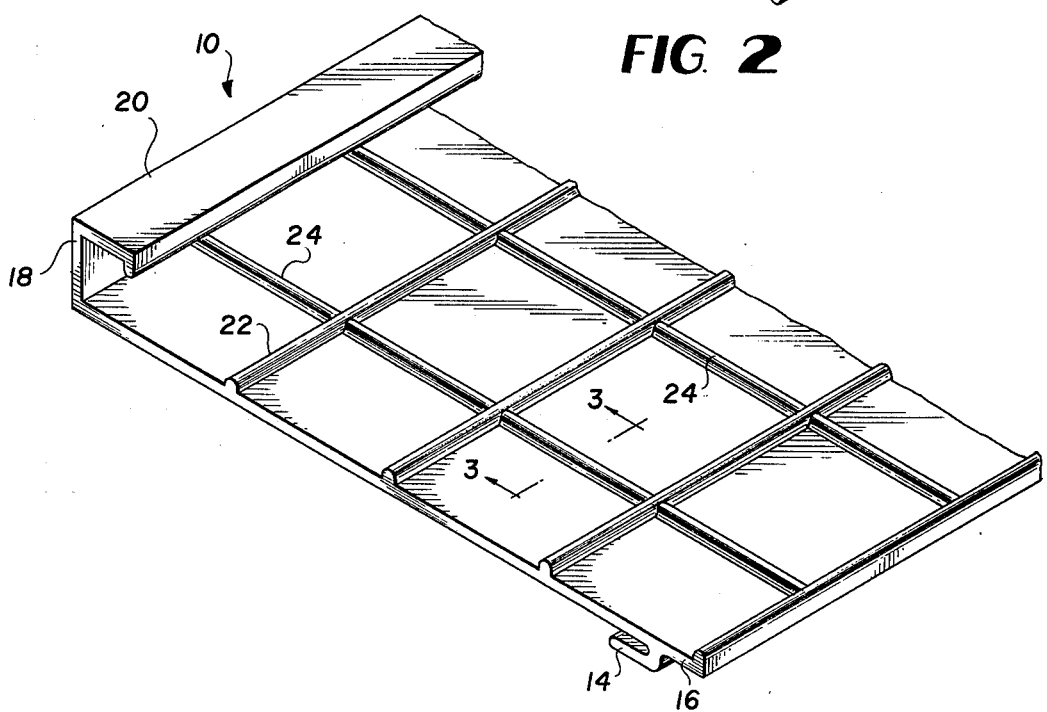
FIG. 2
FIG. 3
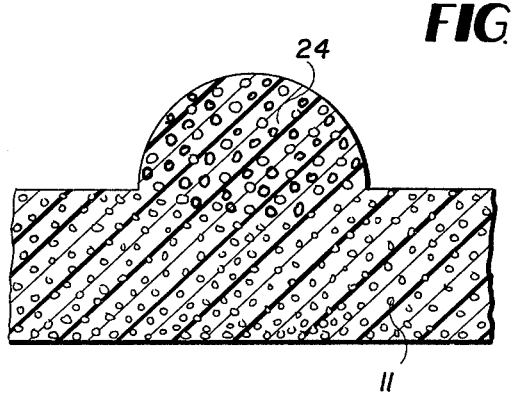

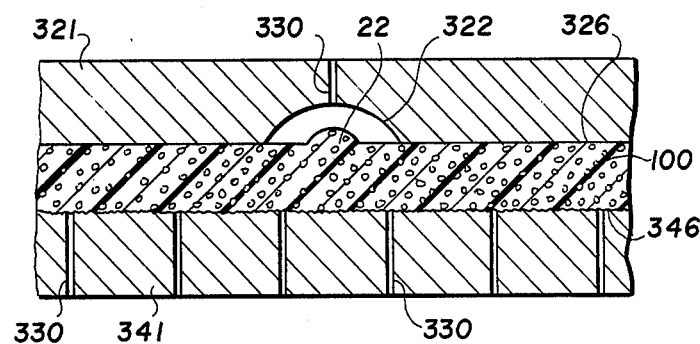
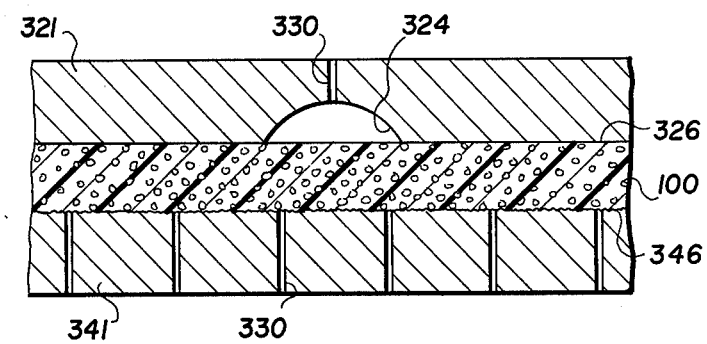
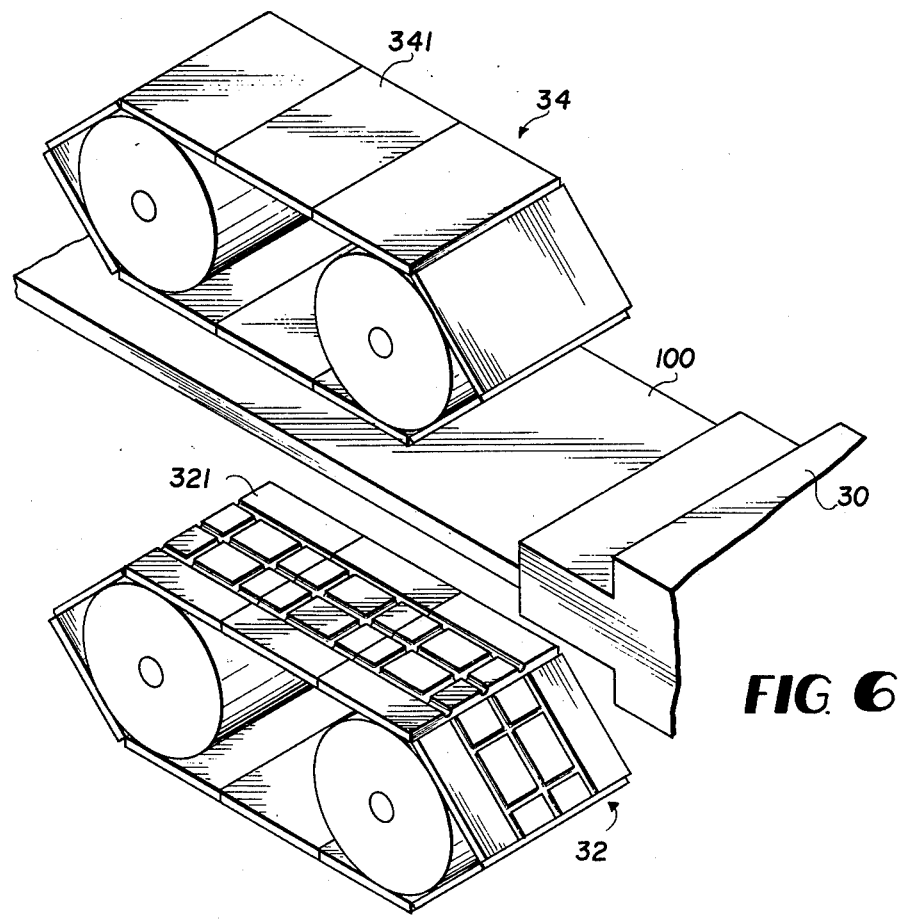

HIGH STIFFNESS CELLULAR PLASTIC SIDING

FIELD OF INVENTION

The present invention relates to siding and, more particularly, to unitary cellular plastic siding of improved stiffness.

BACKGROUND

Overlapping exterior siding for houses has been in use for many years. In the early days, such siding was formed of wood. However, wood must be painted at regular intervals for protection and in some instances, paint is ineffective in affording protection as when moisture is able to penetrate through the siding causing blistering and cracking of the paint as well as rotting of the wood.

Various replacement materials for wood in the fabrication of siding have been employed in attempts to retain a pleasing visual effect, while eliminating most of the disadvantages inherent in wood. Typical replacement materials for wood include metal, particularly aluminum, particularly painted aluminum. Other materials have included semi-hardboard, highly-sized insulation board, asbestos sheets, and other materials.

More recently, plastics and particularly vinyl plastics have been used as siding materials. Such plastics may be pigmented to provide desired colors, thereby eliminating the necessity for painting, they are low in cost, have good weather resistance, and do not rot or split. Plastic siding panels have been designed for use alone or with a rigid board-like material called backerboard which is generally formed of materials having insulating properties. Plastic siding panels have been desirably arranged in overlapping and interlocking relationship to provide a pleasing appearance, while concomitantly providing weather resistance and insulation. However, plastic siding heretofore lacked sufficient stiffness so that a wrinkled appearance sometimes resulted. Such plastics are sometimes subject to expansion and contraction upon changes in temperature and readily telegraph very slight irregularities in the materials on which they are placed.

While aluminum and vinyl sidings have become a popular substitute for the periodical or bi-annual painting of homes because of their ready cleanability and resistance to deterioration, these materials have not been entirely satisfactory for the reasons indicated above. Indeed, aluminum siding has become relatively expensive and is inherently less resilient. To overcome the problems in vinyl siding, mentioned above, requires excessive thicknesses, thereby causing such material also to be unduly expensive.

Accordingly, most residential siding made from plastic or aluminum which has reached the market shares the problem of being flimsy, i.e. such siding lacks stiffness in both longitudinal and transverse direction. My U.S. Pat. No. 3,815,310 is one attempt to deal with the problem of lack of stiffness, but one problem with such a construction is that it has plural layers, i.e. it is not unitary, and this also leads to an undesirably high cost of production.

The Lewis U.S. Pat. No. 3,998,021 shows an insulated siding panel assembly comprising an elongated outer panel of deformable sheet material, e.g. PVC, aluminum or steel of about 30 mils, supported to resist deformation by an elongated synthetic resin backing member formed of, for example, closed cellular polystyrene foam, PVC, polyethylene or polyurethane of about 375 mils disposed therebehind. The backing member has at least one longitudinally extending reinforcing rib projecting away from the outer panel and abutting a vertical support surface when the outer panel is mounted thereon. This structure, being a two-piece assembly and having undue thickness, results in a product which is still too expensive.

The patent to Sanders U.S. Pat. No. 4,034,528 relates to an insulating vinyl siding, each panel being composed of a thermoplastic polymer outer facing layer with an ornamental design, a foam filler and a metallic foil backing. The top and bottom edges of each panel form respectively a cooperating and mating tongue and groove arrangement for interengagement with other such siding units. The inert, at least semirigid foam filler, preferably of polyurethane foam, acts as an internal thermal barrier, the metallic foil backing layer being bonded directly to the filler. The facing may be formed of polyolefins, polyvinyls, polycarbonates, etc. Such a three-piece assembly is too thick, its fabrication is difficult, and it results in too expensive a product.

The Hatch et al U.S. Pat. No. 3,504,467 shows an unfoamed PVC siding panel which may, however, be backed by insulating backerboard of glass wool, particle board or plastic foam. This patent describes the advantages and disadvantages of conventional PVC siding, a major disadvantage being lack of stiffness which causes surface distortions. The rigidity of the siding may be increased by ribs located at spaced intervals on its back surface.

Other prior art, located during the course of a preliminary search, is as follows:

U.S. Pat. No. 4,022,643—Clark
U.S. Pat. No. 2,339,489—Kublanow
U.S. Pat. No. 3,936,518—Soda et al
U.S. Pat. No. 3,478,138—Friesner
U.S. Pat. No. 2,816,853—Meyers

SUMMARY

It is, accordingly, an object of the present invention to provide for improved siding.

It is another object of the present invention to overcome deficiencies in the prior art, such as mentioned above.

Another object is to provide a method resulting in a foam plastic siding having significant improved stiffness, toughness and tear resistance; and the resultant product of density and toughness capable of withstanding impact and tearing.

It is another object of the present invention to provide an improved exterior siding, particularly useful for residential purposes, which has good stiffness, adequate strength, insulating properties, and which is formed of a unitary body in an inexpensive manner and is therefore relatively inexpensive.

Yet another object is to provide improved residential siding formed of thermoplastic, structural foam, having a permanent attractive exterior surface, capable of withstanding weathering, and free from distortions and unattractive irregularities.

It is yet another object of the invention to provide buildings with an attractive exterior surface having thermal insulation and fire-resistant characteristics, in an inexpensive manner.

It is a further object to provide siding material of structural thermoplastic foam having increased strength and stiffness, good insulation properties, and reinforcement ribs having a density of less than the average density of the siding material.

These and other objects are attained according to the present invention by providing a unitary siding material extruded of structural foam plastic. The material is extruded at a thickness of about 40–55 mils and is permitted to expand about ⅓ to a thickness of about 55–85 mils with a corresponding reduction in density of about ⅓. The extrudate is so shaped as to provide reinforcing ribs which themselves have a thickness of about ½ to about equal the thickness of the body of the siding material, and the density of the ribs is about ½ to ¾ of the density of the body portion of the siding.

BRIEF DESCRIPTION OF THE DRAWING

The invention will now be described in more detail with reference to the following detailed description of preferred embodiments taken in conjunction with the accompanying drawing, wherein:

FIG. 1 is a perspective view taken generally from the front and edge, showing an embodiment of the siding of the present invention;

FIG. 2 is another perspective view of a siding in accordance with the present invention viewing the edge and back of the siding;

FIG. 3 is a schematic sectional view taken along lines 3—3 of FIG. 2;

FIGS. 4 and 5 are schematic sectional views showing the manufacture of a siding in accordance with FIG. 2 after initial foaming but before completion of foaming, FIGS. 4 and 5 being taken along sections at right angles from one another; and FIG. 6 is an exploded schematic view showing an apparatus and method for making an embodiment in accordance with FIG. 2.

DETAILED DESCRIPTION OF EMBODIMENTS

FIG. 1 is a perspective view generally showing a siding 10 in accordance with the present invention having a main body portion 11 with a facing or exposed surface 12 which may be either smooth or embossed with a suitable design, e.g. embossed with a wood grain design. The siding 10 is of unitary construction and is normally formed in convenient and suitable lengths of 6–13 feet and widths of 6–12 inches, of suitable foam plastic as will be described in more detail below.

The upper end of the main body portion 11 of the siding 10 is provided with a hook-like flange 14 which projects outwardly from the facing surface 12. An extension 16 projects upwardly beyond the hook-like flange 14, the purpose of the extension 16 being to drive nails therethrough into supporting structure during installation of the siding. At the bottom portion of the siding 10 is a bottom flange 18 projecting in a direction opposite to the hook-like flange 14, and extending upwardly from the bottom flange 18 in a direction generally parallel to the main portion 11 of the siding is another flange 20, the flanges 18 and 20 together with the bottom of the main portion 11 of the siding defining a channel.

It will be understood that during installation the bottom flange 18 will space the bottom portion of the siding outwardly from the vertical surface to which it is attached, while at the upper end thereof the extension 16 will be relatively flush against the supporting surface. When the next adjacent siding panel 10 is installed immediately above, the flange 20 of the upper siding panel will hook beneath the hook-like flange 14 of the siding panel 10 installed immediately therebeneath, thereby covering the hook-like flange 14 and the extension 16 of the lower panel 10.

As shown in FIG. 1, the siding 10 has a plurality of reinforcing ribs 22 extending outwardly from the plane of the back surface of the main portion 11. In the embodiment illustrated in FIG. 1, the thickness of the main portion 11, exclusive of the ribs 22, is about 60 mils, the thickness including the ribs 22 is about 120 mils, the width or height of the main portion 11 of the siding panel 10, i.e. from the bottom flange 18 to a location across from the bottom of the flange 14, is about 8 inches, and the distance from the bottom of the flange 14 to the top of the extension 16 is about ⅝ of an inch.

FIG. 2 shows the siding panel 10 of FIG. 1 from the rear side. From this view it can be seen that in addition to the reinforcing ribs 22 visible in FIG. 1, there are also a plurality of reinforcing ribs 24 running in a different direction, preferably at right angles to the ribs 22. While it is preferred that the ribs 22 run longitudinally of the siding panel 10 so that they may at least be in part formed during the extrusion operation, and it is also preferred that the ribs 24 run at right angles thereto in a transverse direction, it will be understood that the precise orientation of the ribs is not critical. What is important, however, is the nature of the foam from which the panel is formed.

FIG. 3 schematically illustrates a cross section taken through a rib 24, and it is seen schematically that the density of the rib 24 is somewhat less than the density of the body portion 11. This result is achieved during the foaming operation as will be explained in more detail below. It will be understood, however, that the foaming is controlled to give a body with controlled density able to withstand impact and tearing and which is also not flimsy, and which at the same time does not require the presence of backerboard or any separate reinforcing material, and also does not utilize excessive quantities of material. This improved stiffness and tear resistance is achieved by controlling the foaming so that the density of the raw material at the body portion 11 is decreased by about ⅓ with a corresponding increase in thickness of about ⅓.

Accordingly, when the preferred material, polyvinylchloride, is used, having a specific gravity of about 1.5 in the unfoamed condition, foaming is controlled during extrusion and subsequently to reduce the specific gravity of the main portion 11 to about 0.85 to 1.15, preferably about 1.0. The thickness of the wall 11 will be controlled to between 55 and 85 mils and in the example of a 60 mil thick wall will have about the same weight and cost as solid vinyl of only 45 mils thickness, but will have much better insulation properties, stiffness and tear resistance, and without having the weakness of more highly foamed materials.

The density of the reinforcing ribs 22 and 24, on the other hand, will be substantially less than the density of the main body portion. In the area of the ribs there will be additional foaming, as explained below, with the consequence that the ribs will range in thickness between about ½ the thickness of the body 11 to a thickness about equal to that of the thickness of the body 11. Thus, the density of the ribs will vary between about ½ to about ¾ of the density of the body portion 11, preferably about 0.75, when the density of the body portion is controlled to about 1, but as low as about 0.45 when the main body density is 0.85, up to as high as about 0.85 for the ribs when the main body density is 1.15.

While the preferred composition is a conventional polyvinyl chloride, it will be understood that other compositions can be used such as fire-resistant polypropylene or other types of weather and fire-resistant thermoplastics. If the plastic is not weather-resistant, it will need a weathering surface. A conventional polyvinyl chloride formulation, having a density in the solid state of 1.45, which has been found satisfactory, comprises 100 parts of rigid PVC, 3 parts of tin stabilizer, 2 parts of calcium stearate, 2 parts of stearic acid, 15 parts of acrylic polymer impact modifier, 15 parts of titanium dioxide and 1 part diazo-dicarbonamide as blowing agent.

FIGS. 4–6 show a process for forming a continuous siding panel 10 in accordance with the present invention. An extruder 30 is provided having a die in the general configuration of the cross section of the panel 10, except that the width of the die opening is less than the width of the ultimate product and, of course, no provision can easily be made in the die for producing the transverse ribs 24. An extrudate 100, shown as a flat sheet for purposes of simplicity, issues from the die and is then passed between a pair of molding devices 32 and 34, comprising series of molds 321 and 341. The distance between the molding surfaces of the molds 321 and 341 is carefully controlled to determine the thickness of the extrudate 100 which then becomes the main body portion 11 of the siding panel 10.

FIG. 4 shows the extrudate 100 after it has initially expanded and has been passed between a pair of molding surfaces 326 and 346, of, respectively, the molding devices 32 and 34. The molding surface 346 may be configured, as noted above, to provide an embossed wood grain configuration on the exterior surface 12 of the resultant panel 10. Vacuum openings 330 may be provided through both pressing molds 321 and 341 to assist in the molding operation, if desired. The mold 321 is provided in the molding surface 326 with a plurality of longitudinal grooves 322 for the formation of the ribs 22. FIG. 4 is a cross section looking in the longitudinal direction of the extrudate and the rib 22 has been only performed by the extrusion die, but the foam plastic has not yet fully expanded into the rib forming groove 322. It will be understood that the molding surfaces 322 and 342 also serve to form a skin on the foam.

FIG. 5 is another cross section through the molds and the extrudate 100, this time looking in the lateral direction of the extrudate 100. A plurality of laterally extending cavities 324 is provided in the molding surface 326 of the mold 321 into which the extrudate is permitted to expand to form the transverse ribs 24. It will be understood, from a comparison of FIGS. 4 and 5, that the ribs 22 will be of slightly greater density than the ribs 24, if formed to the same size, because the ribs 22 are preformed during the extrusion as seen from FIG. 4, while the ribs 24 are not. Therefore, the degree of expansion to fill each groove 322 is less than that necessary to fill each groove 324. It is thus seen that the process controls the density to provide a siding panel 10 of variable, but controlled, density.

The apparatus schematically shown in FIG. 6 constitutes two series of plate molds 321 and 341, each mounted on a conveyor supported by suitable rollers to control the space between molding surfaces 326 and 346, and adapted to move at the same rate as the extrusion rate. The use of such plate molds gives better control than the use of embossing rollers which only contact the extrudate for a brief moment. As noted above, the plates 341 each have a contacting surface 346 which controls the appearance of the exposed surface 12 of the siding panel 10, e.g. the surface 346 can be embossed such as with a wood grain pattern or, if preferred, can be smooth. On the other hand, the opposing plates 321 have the grooves 322 and 324, which may be connected to vacuum to form the lower density ribs 22 and 24 on the backside of the panel 10.

As the extrudate 100 leaves the extrusion die, its thickness is controlled by the distance between the plates 321 and 341. The plastic has enough blowing agent included to expand the wall to fill the grooves 322 and 324. By the time the extrudate has reached the downstream end of the molding devices 32 and 34, the composition has fully solidified and foaming has ceased. After exiting from the downstream end of the molding devices 32 and 34, the siding, of controlled thickness and density and having good stiffness, tear strength and impact strength, is then cut to suitable lengths.

It will be obvious to those skilled in the art that various changes may be made without departing from the scope of the invention and the invention is not to be considered limited to what is shown in the drawings and described in the specification.

What is claimed is:

1. An insulated, stiff and tear-resistant siding panel of integral and unitary extruded foam plastic construction comprising a main body portion having an upper end and a lower end and a back and a front, a hook-like flange projecting outwardly from the front of said main body portion near the upper end thereof, and a second flange projecting outwardly from the back of said main body substantially at the lower end thereof, said siding panel having a backing skin surface and a facing skin surface, said main body portion having a thickness of about 55–85 mils, a plurality of integral crossing ribs extending from said backing surface and unitary therewith, said ribs having a thickness of about 25–65 mils, said facing surface being substantially flat, said foam plastic of said main body portion being on the order of about $\frac{1}{3}$ by volume cells, and said foam plastic of said ribs being on the order of about $\frac{1}{2}$ by volume cells.

2. An insulated siding in accordance with claim 1 of polyvinyl chloride having a specific gravity of about 1.5, wherein the density of said main body portion is about 0.85 to 1.15 and the density of said ribs is about 0.45 to 0.85.

3. An insulated siding in accordance with claim 2 wherein said ribs cross at substantially right angles.

4. An insulated siding in accordance with claim 3 wherein some of said ribs extend longitudinally of said siding and others extend laterally thereof.

5. An insulated siding in accordance with claim 2 wherein the substantially flat facing is embossed.

6. An insulated siding panel in accordance with claim 1 further comprising a third flange projecting upwardly from approximately the end of said second flange, said third flange being generally parallel to said main body portion.

7. An insulated, stiff and tear-resistant siding panel of integral and unitary extruded foam plastic construction comprising a main body portion having a backing skin surface and a facing skin surface, said main body portion having a thickness of about 55–85 mils, a plurality of integral crossing ribs extending from said backing surface and unitary therewith, said ribs having a thickness of about 25–65 mils, said facing surface being substantially flat, said foam plastic of said main body portion being on the order of about ⅓ by volume cells, and said foam plastic of said ribs being on the order of about ⅛ by volume cells, wherein some of said ribs extend longitudinally of said siding and are of a density greater than the ribs not extending longitudinally.

* * * * *